United States Patent [19]
Terayama et al.

[11] Patent Number: 5,645,741
[45] Date of Patent: Jul. 8, 1997

[54] ARC PROCESSING APPARATUS COMPRISING DRIVING MEANS FOR CONTROLLING OUTPUT TRANSISTOR SO THAT OUTPUT VOLTAGE BECOMES PREDETERMINED NO-LOAD VOLTAGE

[75] Inventors: Kikuo Terayama, Kawabe-gun; Ichiro Umezawa, Kobe; Satoru Yamaguchi, Ibaraki; Hitosige Nakamura, Osaka, all of Japan

[73] Assignee: Daihen Corporation, Osaka, Japan

[21] Appl. No.: 578,458

[22] Filed: Dec. 26, 1995

[30] Foreign Application Priority Data

Dec. 28, 1994 [JP] Japan ................... 6-338656

[51] Int. Cl.$^6$ ................... B23K 9/067
[52] U.S. Cl. ................... 219/130.4; 219/130.21; 219/130.31
[58] Field of Search ................... 219/130.4, 130.21, 219/130.31, 130.32, 130.33, 137 PS

[56] References Cited

U.S. PATENT DOCUMENTS

| | | | |
|---|---|---|---|
| 2,734,981 | 2/1956 | Bichsel et al. | 219/130.1 |
| 3,026,407 | 3/1962 | Bergmann . | |
| 3,356,928 | 12/1967 | Parrish | 219/130.32 |
| 3,444,430 | 5/1969 | Needham | 219/130.1 |
| 3,530,359 | 9/1970 | Grist | 219/130.32 |
| 3,629,548 | 12/1971 | Rygiol | 219/130.31 |
| 3,665,149 | 5/1972 | Sakabe et al. . | |
| 3,792,225 | 2/1974 | Needham et al. | 219/130.21 |
| 4,525,621 | 6/1985 | Puschner | 219/130.33 |
| 5,343,017 | 8/1994 | Karino et al. . | |

FOREIGN PATENT DOCUMENTS

| | | |
|---|---|---|
| 2 695 584 | 3/1994 | France . |
| 56-17773 | 4/1981 | Japan . |
| 56-74374 | 6/1981 | Japan . |
| 62-45817 | 12/1987 | Japan . |
| 2-108462 | 4/1990 | Japan . |
| 6-182548 | 7/1994 | Japan . |

OTHER PUBLICATIONS

Schnelle elekronische Speisequellen Fur Schweisslichtbogen, Elektrie, vol. 48, No. 4, 1994, Berlin, pp. 143–150.

*Primary Examiner*—Clifford C. Shaw
*Attorney, Agent, or Firm*—Scully, Scott, Murphy and Presser

[57] ABSTRACT

In an arc processing apparatus for supplying an electric power for an arc process through output terminals to a load containing an electrode and a workpiece to be processed, a main power source supplies an electric power for arc process to the load, and an auxiliary power source supplies another electric power to the load, where the auxiliary power source has a no-load voltage higher than that of the main power source and an electric power capacity smaller than that of the main power source. First and second output switches turn on or off supply of the electric power from the main and auxiliary power sources, respectively. A controller turns on the second output switch so as to short-circuit the electrode with the workpiece and to perform an arc activation, and thereafter, in response to an arc detection signal representing generation of an arc, turns on the first output switch. Further, an output control transistor is electrically connected in series between the auxiliary power source and the output terminals, and a driving circuit controls the output control transistor so that an output voltage becomes a predetermined no-load voltage in a range of an output current from zero to a predetermined threshold current.

12 Claims, 8 Drawing Sheets

ARC PROCESSING APPARATUS COMPRISING DRIVING MEANS FOR CONTROLLING OUTPUT TRANSISTOR SO THAT OUTPUT VOLTAGE BECOMES PREDETERMINED NO-LOAD VOLTAGE

BACKGROUND OF THE INVENTION

1. Field of the Invention

The present invention relates to an improvement of an arc processing apparatus of a system for use in an arc process such as an arc welding process, an arc cutting process, an arc heating process, an arc melting process or the like, and in particular, to an arc processing apparatus of a system in which arc is started by once short-circuiting an electrode with a workpiece to be processed and thereafter separating the electrode from the workpiece in arc processing. In more particular, the present invention relates to an arc processing apparatus comprising a driving means for controlling an output transistor so that an output voltage from the output control transistor becomes a predetermined no-load voltage.

2. Description Of the Related Art

FIG. 6 is a circuit diagram of an exemplified prior art arc processing apparatus.

Referring to FIG. 6, the prior art arc processing apparatus comprises a welding power supply 10, and the followings are connected to the welding power supply 10:

(a) primary power input lines 1 through 3;

(b) an electrode 4 through an electrode cable 6;

(c) a workpiece 5 to be processed through a workpiece cable 7;

(d) ground through a torch switch 8, with an activation ground signal being inputted to a controller CL1 when the torch switch 8 is turned on; and (e) a remote output adjuster 9, with an output control signal having a control voltage determined by the remote output adjuster 9 being inputted to the controller CL1.

The welding power supply 10 includes a primary rectifier DR1, a smoothing electrolytic capacitor C1, an inverter TR1, an inverter transformer T1, a secondary rectifier DR2, a DC reactor LD1, an output current detector CT1, an auxiliary power rectifier DR3, a smoothing electrolytic capacitor C2, a switch S1, a current limiting resistor R1, an auxiliary power current detector CT2, a thyristor SCR1, a voltage detector DT1, the controller CL1, an electrode-use output terminal TM1, and a workpiece-use output terminal TM2.

In FIG. 6, the primary rectifier DR1, the smoothing electrolytic capacitor C1, the inverter TR1, the inverter transformer T1, the secondary rectifier DR2, the DC reactor LD1, the output current detector CT1 and the controller CL1 constitute a main power source MPS for supplying a DC electric power for an arc process. On the other hand, the auxiliary power rectifier DR3, the smoothing electrolytic capacitor C2, the current limiting resistor R1 and the auxiliary power current detector CT2 constitute an auxiliary power source APS for supplying a DC electric power for an arc activation or start for the arc process.

The switch S1 is a switching means for turning on and off the auxiliary power source APS, while the thyristor SCR1 is another switching means for turning on and off the main power source MPS. Further, an output characteristic of the main power source MPS becomes a constant-current characteristic achieved under a constant-current control through a feedback control by the output current detector CT1, the controller CL1 and the inverter TR1, while an output characteristic of the auxiliary power source APS becomes a drooping characteristic achieved by the current limiting resistor R1.

FIG. 7 is a graph showing an output characteristic of the prior art arc processing apparatus shown in FIG. 6.

As shown in FIG. 7, a no-load voltage Vst1 of the auxiliary power source APS is set to be higher than a no-load load voltage Vst2 of the main power source MPS, and a short-circuit current Is2 of the main power source MPS is set to be greater than a short-circuit current Ist1 of the auxiliary power source APS.

In the arc processing apparatus shown in FIG. 6, when the torch switch 8 is pressed so as to be turned on, an activation ground signal is inputted to the controller CL1. In response to the activation ground signal, the controller CL1 drives a gas supply circuit (not shown). The gas supply circuit discharges a shield gas a location between the electrode 4 and the workpiece 5 which are opened with respect to each other. Taking into consideration a time necessary for the shield gas to reach the electrode 4, when the shield gas reaches the electrode 4, the controller CL1 activates the inverter TR1 and turns on the switch S1 with the thyristor SCR1 put in the OFF-state thereof. Upon this operation, the no-load voltage Vst2 of the main power source MPS is not applied to a load of air between the electrode 4 and the workpiece 5 since the thyristor SCR1 is in the OFF-state thereof, and the no-load voltage Vst1 of the auxiliary power source APS is applied to the load therebetween. When the electrode 4 and the workpiece 5 are short-circuited with each other in this state, the short-circuit current Is1 shown in FIG. 7 flows in the load therebetween.

Subsequently, when the electrode 4 is separated from the workpiece 5 and there is generated a relatively small arc smaller than a welding arc generated upon the arc process, the voltage between the output terminals TM1 and TM2 decreases. The voltage detector DT1 detects whether or not an arc is generated by detecting whether or not the voltage between the output terminals TM1 and TM2 becomes lower than a predetermined detection voltage, and outputs an arc detection signal upon generation of the arc. The controller CL1 receives the arc detection signal outputted from the voltage detector DT1, and then, the controller CL1 decides that an arc has been generated. Then, the controller CL1 makes the thyristor SCR1 conductive, and subsequently turns off the switch S1. Consequently, an electric power starts to be supplied from the main power source MPS to the relatively small arc generated in the load containing the electrode 4 and the workpiece 5, and then, the relatively small arc grows into a welding arc. If the arc vanishes when the electrode 4 is separated from the workpiece 5, the controller CL1 does not make the thyristor SCR1 conductive, so that no electric power is supplied from the main power source MPS.

In the prior art apparatus shown in FIG. 6, the relatively small arc generated when the electrode 4 is separated from the workpiece 5 is a relatively small current, and therefore, the generated arc becomes unstable. When the no-load voltage Vst2 of the main power source MPS is relatively low, the arc tends to vanish. However, if the no-load voltage Vst2 is increased, an electric power capacity of the arc processing apparatus increases depending on (no-load voltage)×(rated output current), and this leads to an expensive manufacturing cost. Furthermore, even in the case where the relatively small arc generated when the electrode 4 is separated from the workpiece 5 does not vanish, no stable small arc can be formed when the short-circuit current Is1 of the auxiliary power source APS is relatively small, and therefore, the relatively small arc sometimes cannot be switched or shifted into a welding arc.

FIG. 8 shows a graph for explaining the output. characteristic of the prior art arc processing apparatus.

In order to make the relatively small arc smoothly be switched or shifted into a welding arc, the current in the stage is required to be increased. However, when the no-load voltage Vst1 of the auxiliary power source APS is not changed, the value of the current limiting resistor R1 is required to be reduced so that the short-circuit current of the auxiliary power source APS becomes a current Is3 greater than Is1. However, when the resistance value of the current limiting resistor R1 is reduced so as to increase the short-circuit current, this results in a gradual inclination of the drooping characteristic, and consequently the stability of the relatively small arc is reduced. On the contrary, in order to increase the short-circuit current without changing the inclination of the drooping characteristic, the no-load voltage of the auxiliary power source APS is required to be increased to a relatively large voltage, for example, a voltage Vst3 as shown in FIG. 8. In such a case, there is such a problem that it is necessary to provide the auxiliary power source APS having a relatively large electric power capacity.

SUMMARY OF THE INVENTION

An essential object of the present invention is therefore to provide an arc processing apparatus capable of increasing the short-circuit current of the auxiliary power source APS without increasing the no-load voltage of the auxiliary power source APS-nor making gradual the inclination of the drooping characteristic.

Another object of the present invention is to provide an arc processing apparatus capable of smoothly making a relatively small arc be switched or shifted into a stable welding arc.

According to one aspect of the present invention, there is provided an arc processing apparatus for supplying an electric power for an arc process through output terminals to a load containing an electrode and a workpiece to be processed, comprising:

a main power source for supplying an electric power for arc process through said output terminals to said load;

an auxiliary power source for supplying another electric power through said output terminals to said load, said auxiliary power source having a no-load voltage higher than that of said main power source and an electric power capacity smaller than that of said main power source;

first output switching means for turning on or off supply of the electric power from said main power source;

second output switching means for turning on or off supply of the electric power from said auxiliary power source;

arc detecting means for detecting generation of an arc by detecting whether or not a voltage between said output terminals is lower than a predetermined threshold voltage, and outputting an arc detection signal;

control means for turning on said second output switching means so as to short-circuit said electrode with said workpiece and to perform an arc activation, and thereafter, in response to the arc detection signal, for turning on said first output switching means;

output control transistor electrically connected in series between said auxiliary power source and said output terminals; and driving means for controlling said output control transistor so that an output voltage from said output terminals becomes a predetermined no-load voltage in a range of an output current flowing in said output terminals from zero to a predetermined threshold current.

The above-mentioned arc processing apparatus preferably further comprises:

a DC reactor electrically connected in series between said output control transistor and said output terminals.

The above-mentioned arc processing apparatus preferably further comprises:

a further DC reactor electrically connected in series between said main power source and said output terminals.

The above-mentioned arc processing apparatus further comprises:

a first DC reactor electrically connected in series between said main power source and said output terminals; and a second DC reactor electrically connected in series between said output control transistor and said output terminals;

wherein windings of said first DC reactor and windings of said second DC reactor are wound around an iron core so that magnetic fluxes in the same direction are generated when currents flow in both of the windings of said first DC reactor and the windings of said second DC reactor respectively from said main power source and said auxiliary power source in an identical direction.

The above-mentioned arc processing apparatus preferably further comprises:

a current limiting resistor for providing a drooping characteristic in an output voltage to an output current characteristic of said auxiliary power source, said current limiting resistor being electrically connected in series between said auxiliary power source and said output control transistor.

The above-mentioned arc processing apparatus preferably comprises:

feedback control means for providing a constant-current characteristic in a range of the output current from zero to the predetermined threshold current, and providing a drooping characteristic in another range of the output current from the predetermined threshold current to a predetermined short-circuit current, in an output voltage to an output current characteristic of said auxiliary power source.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENT

Preferred embodiments according to the present invention will be described below with reference to the attached drawings.

FIRST PREFERRED EMBODIMENT

Figure 1:
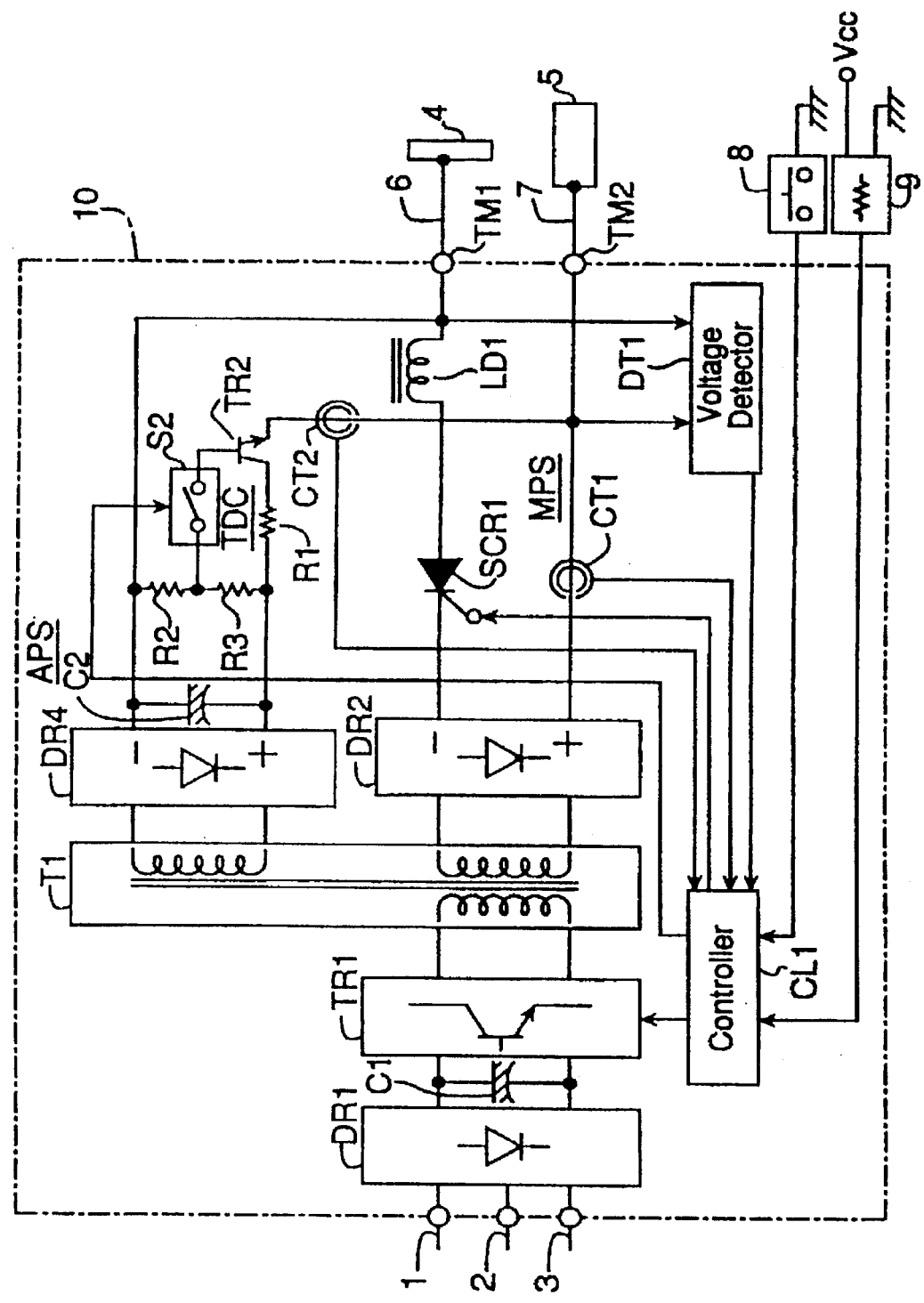
FIG. 1 is a circuit diagram of an arc processing apparatus of a first preferred embodiment of the present invention.

FIG. 1 is a circuit diagram of an arc processing apparatus of a first preferred embodiment of the present invention. In FIG. 1, the same components as those shown in FIG. 6 are denoted by the same reference numerals as those shown in FIG. 6.

Figure 6:
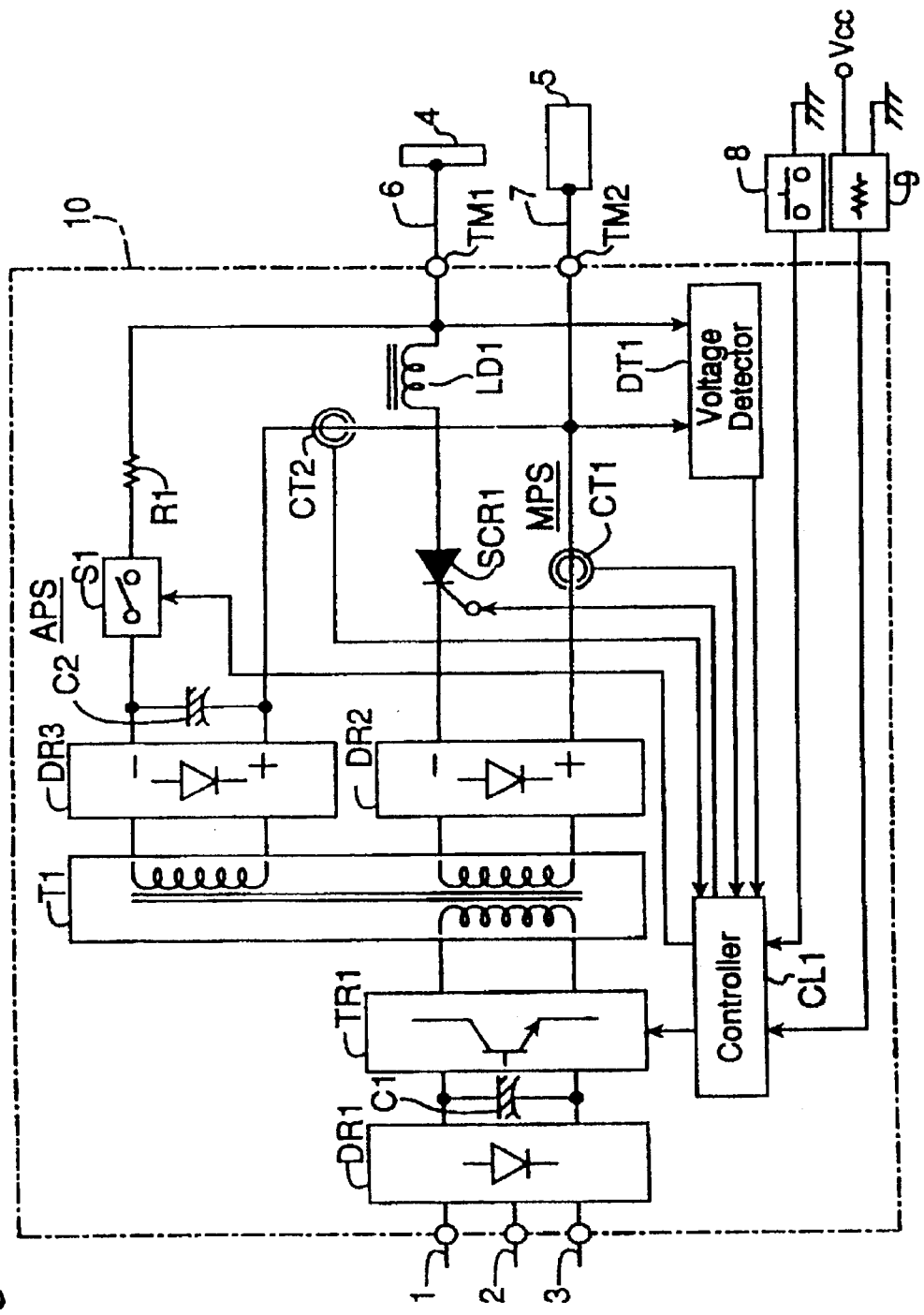
FIG. 6 is a circuit diagram of a prior art arc processing apparatus.
Figure 7:
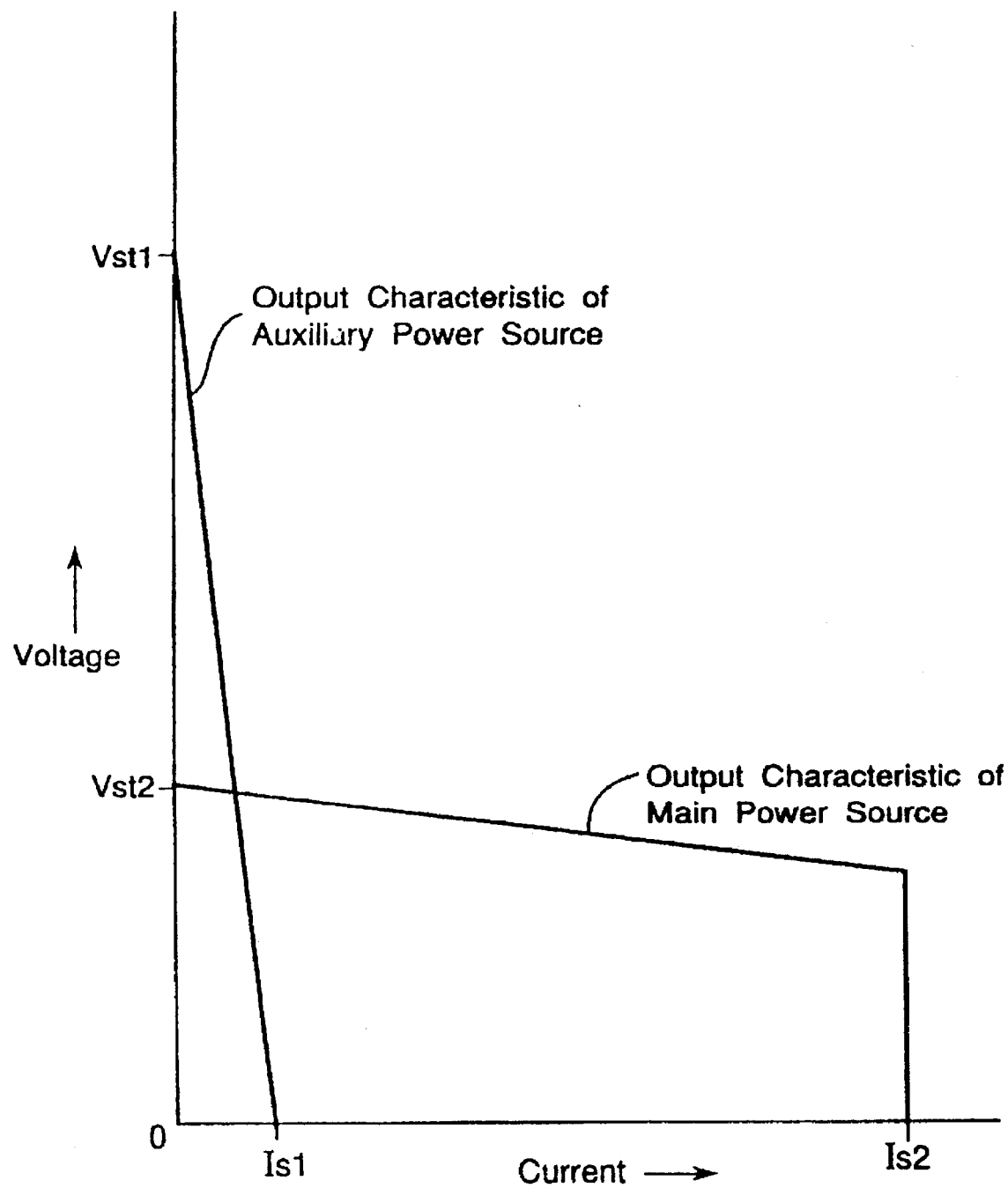
FIG. 7 is a graph showing an output characteristic of the prior art arc processing apparatus shown in FIG. 6.
Figure 8:
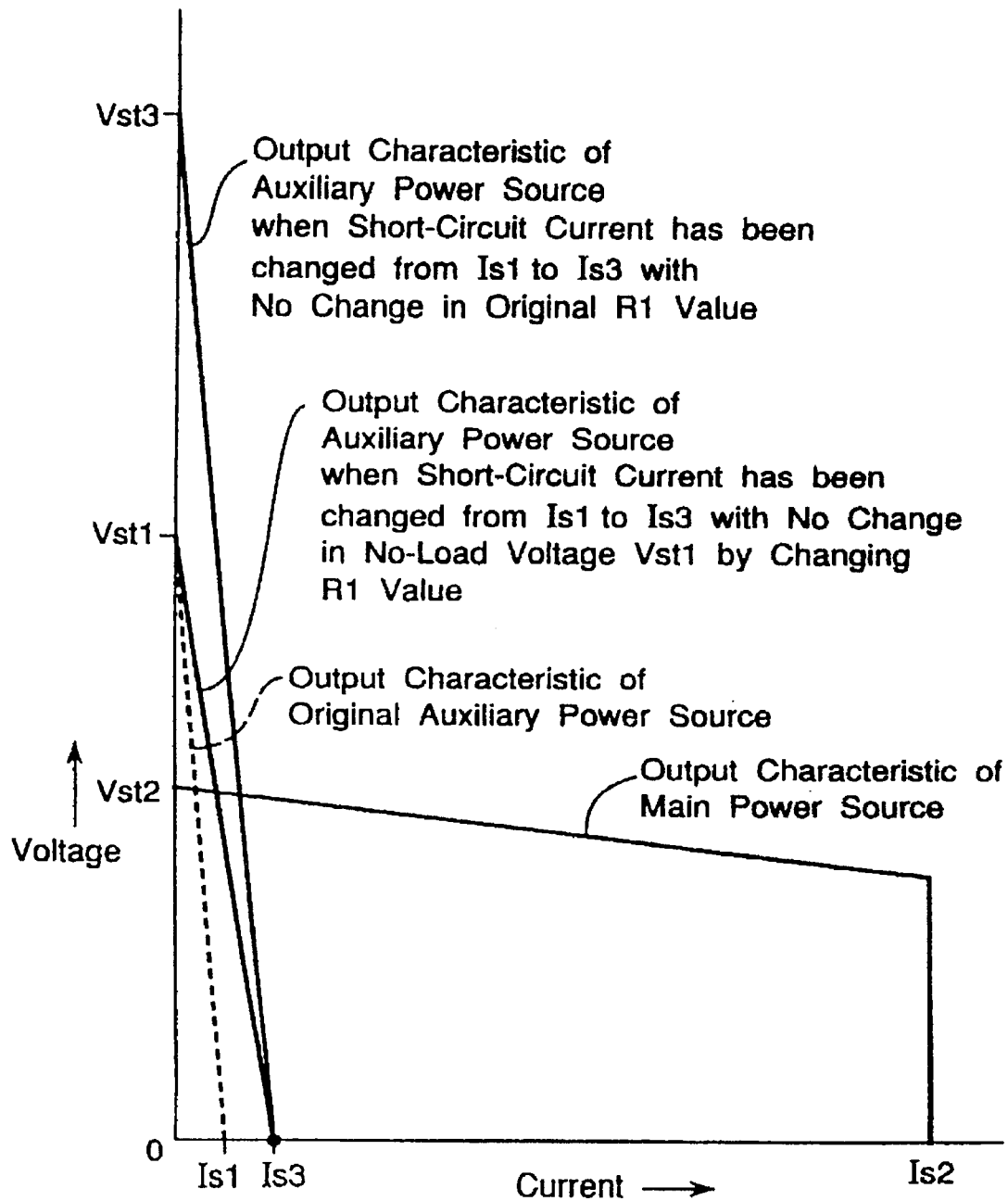
FIG. 8 is a graph showing an output characteristic of the prior art arc processing apparatus shown in FIG. 6.

As is apparent from comparison between FIGS. 1 and 6, the arc processing apparatus of the first preferred embodiment is characterized in further comprising an output control transistor TR2 and an output transistor driving circuit TDC having resistors R2 and R3, and a switch 82, in addition to the circuit of the prior art arc processing apparatus shown in FIG. 6.

Referring to FIG. 1, the arc processing apparatus of the first preferred embodiment comprises a welding power supply 10, and the followings are connected to the welding power supply 10:

(a) primary power input lines 1 through 3;

(b) an electrode 4 through an electrode cable 6;

(c) a workpiece 5 to be processed through a workpiece cable 7;

(d) ground through a torch switch 8, with an activation ground signal being inputted to a controller CL1 when the torch switch 8 is turned on; and (e) a remote output adjuster 9, with an output control signal having a control voltage determined by the remote output adjuster 9 being inputted to the controller CL1.

The welding power supply 10 includes a primary rectifier DR1, a smoothing electrolytic capacitor C1, an inverter TR1, an inverter transformer T1, a secondary rectifier DR2, a DC reactor LD1, an output current detector CT1, an auxiliary power rectifier DR4 corresponding to the auxiliary power rectifier DR3 of FIG. 6, a smoothing electrolytic capacitor C2, a switch S2, a current limiting resistor R1, an auxiliary power current detector CT2, a thyristor SCR1, a voltage detector DT1, the controller CL1, an electrode-use output terminal TM1, a workpiece-use output terminal TM2, the resistors R2 and R3, and the output control transistor TR2.

In FIG. 1, the primary rectifier DR1, the smoothing electrolytic capacitor C1, the inverter TR1, the inverter transformer T1, the secondary rectifier DR2, the DC reactor LD1, the output current detector CT1 and the controller CL1 constitute a main power source MPS for supplying a DC electric power for an arc process.

On the other hand, the auxiliary power rectifier DR4 and the smoothing electrolytic capacitor C2 constitute an original auxiliary power source APS, and there are further provided the output control transistor TR2, the output transistor driving circuit of the resistors R2 and R3, and the switch S2, the current limiting resistor R1, and the auxiliary power current detector CT2. All these components constitute an auxiliary power source circuit for supplying a DC electric power for an arc activation or start for the arc process. It is to be noted that the auxiliary power source APS has an electric power capacity smaller than that of the main power source MPS.

The output control transistor TR2 is electrically connected in series between the original auxiliary power source APS and output terminals TM1 and TM2. In the auxiliary power source circuit, the resistors R2 and R3 divide a voltage across both end terminals of a smoothing electrolytic capacitor C2, and a voltage induced across the resistor R2 is applied to the base of the output control transistor TR2 through the switch S2 controlled by the controller CL1.

In the preferred embodiment, the auxiliary power rectifier DR4 is provided in stead of the auxiliary power rectifier DR3 of FIG. 6. Then, as shown in FIG. 2, a no-load output voltage Vst3 of the auxiliary power source APS having the current limiting resistor R1 upon no-load operation is set to be higher than the no-load voltage Vst1 of the original the auxiliary power source APS shown in FIG. 6 and the no-load voltage Vst2 of the main power source MPS, and a short-circuit current Is3 of the auxiliary power source APS having the current limiting resistor R1 is set to be greater than the short-circuit current Is1 of the original auxiliary power source APS, so that an arc generated in an arc start stage can be stably maintained.

The other components or assemblies having the same functions as those of the prior art apparatus shown in FIG. 6 are denoted by the same reference numerals of FIG. 6, and no description is provided therefor.

In the preferred embodiment shown in FIG. 1, output terminals of the main power source MPS are electrically connected in parallel with the output terminals of the auxiliary power source circuit, respectively, at the output terminals TM1 and TM2. The thyristor SCR1 is provided as an output switching means for turning on or off supply of the electric power from the main power source MPS to the load, while the output control transistor TR2 is provided as another output switching means for turning on or off supply of the electric power from the auxiliary power source APS to the load.

Figure 2:
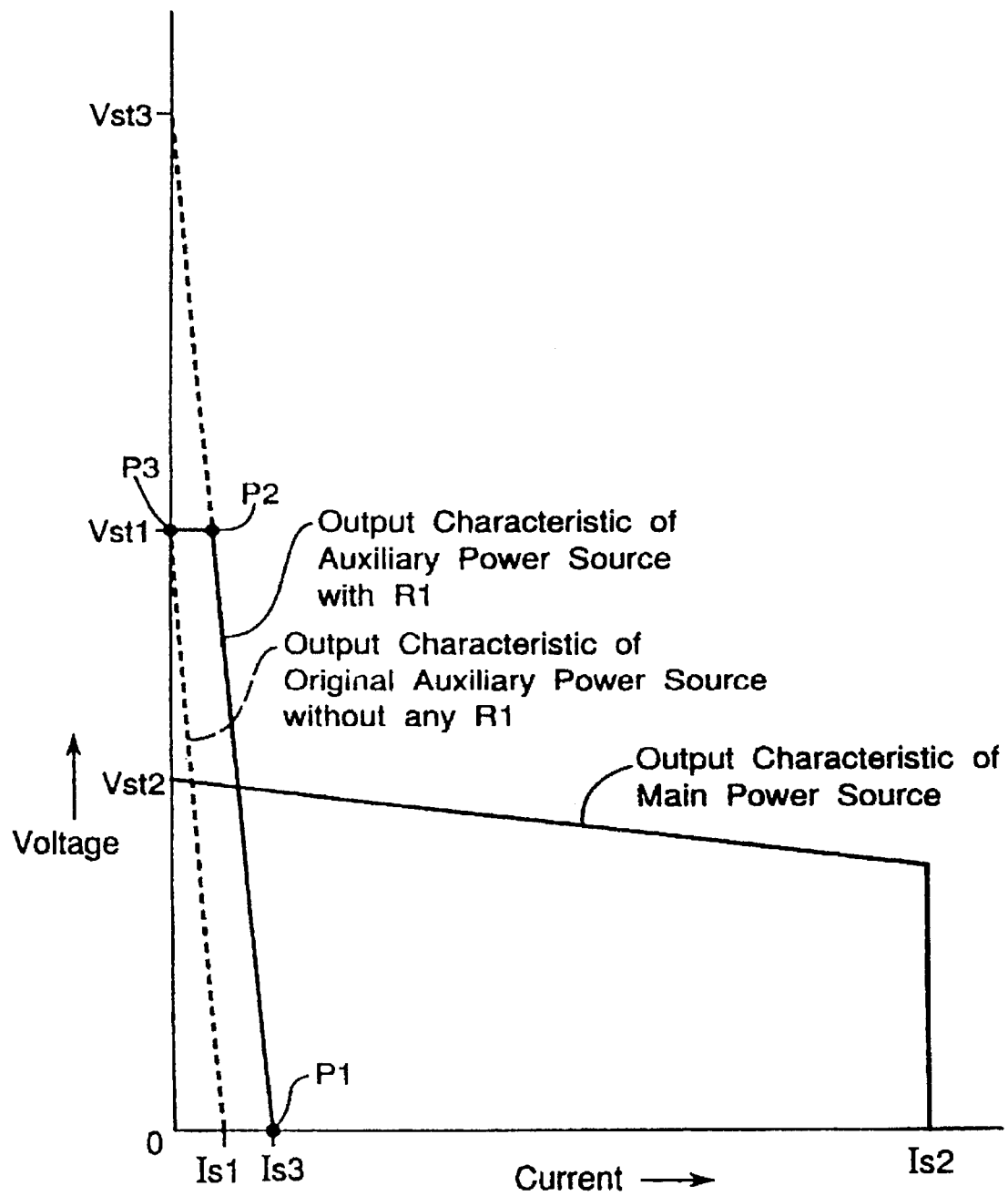
FIG. 2 is a graph showing an output characteristic of the first preferred embodiment of the present invention shown in FIG.1.

FIG. 2 is a graph showing an output characteristic of the preferred embodiment shown in FIG. 1. As shown in FIG. 2, the no-load voltage of the auxiliary power source circuit is limited or suppressed in a range of the output current from zero to a predetermined positive threshold current at P2 of FIG. 2 by an operation of the output control transistor TR2 and the output transistor driving circuit TDC (which will be described in detailed later) to the voltage Vst1 which corresponds to the voltage across both the end terminals of the resistor R2 and which is lower than the output voltage Vst3 of the original auxiliary power source APS having the current limiting resistor R1, and the original auxiliary power source APS having the current limiting resistor R1 has the short-circuit current Is3 larger than the short-circuit current Is1 of the original auxiliary power source APS without the current limiting resistor R1. The current limiting resistor R1 provides a drooping characteristic in the Output voltage to the output current characteristic of the auxiliary power source circuit.

In the arc processing apparatus of FIG. 1, when the torch switch 8 is pressed or turned on, an activation ground signal is inputted to a controller CL1. In response to the activation ground signal, the controller CL1 drives a gas supply circuit (not shown). The gas supply circuit discharges a shield gas a location between an electrode 4 and a workpiece 5 which are opened with respect to each other. Taking into consideration a time necessary for the shield gas to reach the electrode 4, when the shield gas reaches the electrode 4, the controller CL1 activates the inverter TR1 and turns on the switch S2 with the thyristor SCR1 put in the OFF-state thereof. Upon this operation, any no-load voltage of the main power source MPS is not applied to a load of air between the electrode 4 and the workpiece 5 since the thyristor SCR1 is in the OFF-state thereof. An output voltage having an operation characteristic ranging from P1 through P2 to P3 will take place as shown in FIG. 2 by an operation of the output. control transistor TR2 and the output transistor driving circuit TDC as described in detail hereinafter according to the condition of the load containing the electrode 4 and the workpiece 5.

The operation of the output control transistor TR2 and the output transistor driving circuit TDC will be described hereinafter. When the electrode 4 and the workpiece 5 are opened with respect to each other, any current sufficient for making the output control transistor TR2 conductive does not flow into the base of the output control transistor TR2, and therefore, the operation of the output control transistor TR2 is in a linear amplification region thereof, so that the output control transistor TR2 and the output transistor driving circuit TDC operates as an emitter follower. An remitter voltage of the output control transistor TR2 will become approximately equal to the voltage Vst1 across both the end terminals of the resistor R2, and therefore, the output voltage of the output control transistor TR2 becomes constant regardless of the output current. Consequently, the output voltage of the output control transistor TR2 becomes the voltage Vst1 at P3 in FIG. 2.

Further, when the state of the load containing the electrode 4 and the workpiece 5 shifts from the open state to a comparatively great resistance, i.e., when the output characteristic is in a range of P3 to P2 in FIG. 2, any current sufficient for making the output control transistor TR2 conductive does not flow into the base of the output control transistor TR2. In other words, the operation of the output control transistor TR2 and the output transistor driving circuit TDC is in a linear amplification region thereof, and this means that the output control transistor TR2 operates as an emitter follower. The emitter voltage of the output control transistor TR2 will become approximately equal to the voltage Vst1 across both the end terminals of the resistor R2, and therefore, the output voltage of the output control transistor TR2 becomes a predetermined constant no-load voltage Vst1 in a range of the output current from zero to the predetermined threshold output current at P2 of FIG. 2, regardless of the output current.

When the resistance value of the load containing the electrode 4 and the workpiece 5 is reduced and the output characteristic is in a range of P2 to P1 in FIG. 2, the voltage across the electrode 4 and the workpiece 5 becomes sufficiently lower than the voltage across both the end terminals of the resistor R2, and therefore, the current sufficient for making the output control transistor TR2 conductive flows into the base of the output control transistor TR2, so that the output control transistor TR2 becomes completely conductive.

Further, when the electrode 4 is short-circuited with the workpiece 5, the short-circuit current Is3 as indicated at P1 in FIG. 2 flows in the load circuit between the electrode 4 and the workpiece 5.

When the electrode 4 is short-circuited with the workpiece 5 and is then separated from the workpiece 5 to generate a relatively small arc between the electrode 4 and the workpiece 5, the voltage between the output terminals TM1 and TM2 decreases. The voltage detector DT1 detects whether or not an arc is generated by detecting whether or not the voltage between the output terminals TM1 and TM2 becomes lower than a predetermined detection voltage, and outputs an arc detection signal upon generation of the arc. The controller CL1 receives the arc detection signal outputted from the voltage detector DT1, and then, the controller CL1 decides that an arc has been generated. Then, the controller CL1 makes the thyristor SCR1 conductive, and subsequently turns off the switch S2. Consequently, a DC electric power starts to be supplied from the main power source MPS to the relatively small arc generated between the electrode 4 and the workpiece 5, and the relatively small arc grows into a welding arc.

Therefore, in the preferred embodiment shown in FIG. 1, the no-load voltage of the auxiliary power source circuit is not such a high voltage as the voltage Vst3 but a low voltage such as the voltage Vst1 as shown in FIG. 2, and the short-circuit current has a relatively great value such as that of the current Is3. Therefore, the electric power capacity of the auxiliary power source APS is not increased excessively, and the electrode 4 does not fixedly adhere to the workpiece 5 when the relatively small arc is generated. As a result, a stable small-current arc is generated, thereby allowing the arc to be switched or shifted into a welding arc.

Figure 3:
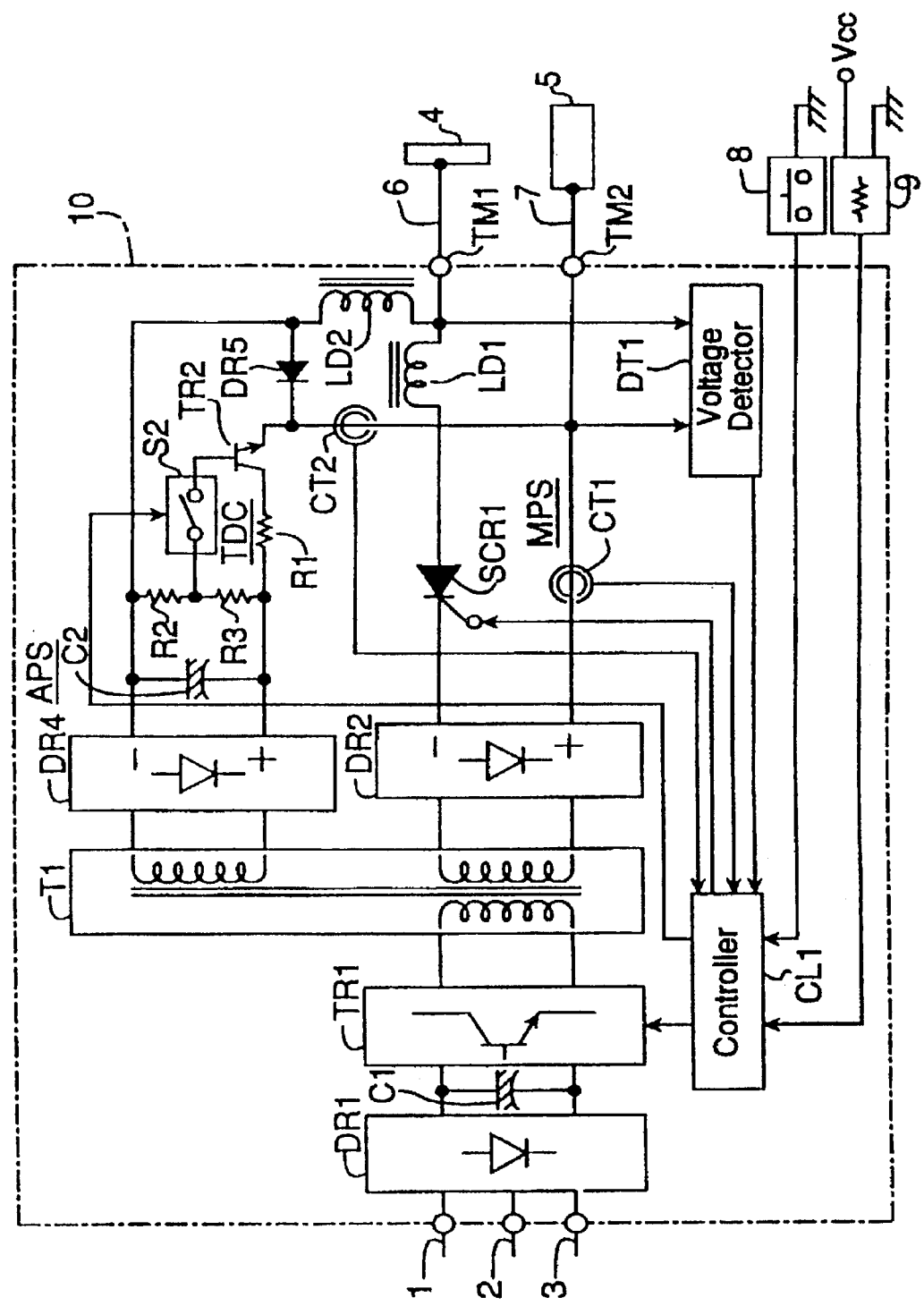
FIG. 3 is a circuit diagram of an arc processing apparatus of a second preferred embodiment of the present invention.

According to the first preferred embodiment of the present invention, in the arc processing apparatus of the system in which the electrode 4 thereof is once short-circuited with the workpiece 5 and is then separated from the workpiece 5 in the arc start stage, the output voltage of the auxiliary power source APS is limited or suppressed in a range of the output current from zero to the predetermined threshold current at P2 of FIG. 2 by the output control transistor TR2 for the purpose of increasing the short-circuit current of the auxiliary power source APS without increasing the no-load voltage of the auxiliary power source APS nor making gradual the inclination of the drooping characteristic. [ps]
SECOND PREFERRED EMBODIMENT FIG. 3 is a circuit diagram of an arc processing apparatus of a second preferred embodiment of the present invention. In FIG. 3, the same components as those shown in FIG. 1 are denoted by the same reference numerals as those shown in FIG. 1.

As is apparent from comparison between FIGS. 1 and 3, there are further provided a DC reactor LD2 of an inductor and a diode DR5, wherein the DC reactor LD2 is electrically connected in series between the negative electrode of the smoothing electrolytic capacitor C2 and the output terminal TM1, and the cathode of the diode DR5 is electrically connected to the emitter of the output control transistor TR2 while the anode of the diode DR5 is electrically connected to the negative electrode of the smoothing electrolytic capacitor C2.

As shown in FIG. 2, the no-load output voltage Vst3 of the original auxiliary power source APS having the current limiting resistor R1 is set to be higher than the no-load voltage Vst1 of the original the auxiliary power source APS and the no-load voltage Vst2 of the main power source MPS, and the short-circuit current Is3 of the original auxiliary power source APS having the current limiting resistor R1 is set to be greater than the short-circuit current Is1 of the original auxiliary power source APS, in a manner similar to that of the first preferred embodiment shown in FIG. 1, and therefore, the output voltage of the auxiliary power source circuit can be lowered by the operation of the output control transistor TR2 and the output transistor driving circuit TDC. The other components or assemblies having the same functions as those of the preferred embodiment shown in FIG. 1 are denoted by the same reference numerals shown in FIG. 1, and no description is provided therefor.

In the arc processing apparatus shown in FIG. 3., a short-circuit current of the auxiliary power source circuit starts to flow in the load containing the electrode 4 and the workpiece 5 when the electrode 4 is put in contact with the workpiece 5. Subsequently, a relatively small arc is generated when the electrode 4 is separated from the workpiece 5. When the current abruptly or suddenly reduces to vanish the arc, electro-magnetic energy that has been accumulated in the DC reactor LD2 is discharged to act so as to impede or prevent the reduction of the current, thereby preventing the arc from vanishing. As a result, the relatively small arc produced by the auxiliary power source circuit is not interrupted, thereby allowing the arc to be smoothly changed or shifted into a welding arc.

It is to be noted that the diode DR5 is a flywheel diode for preventing a surge voltage generated in the DC reactor LD2 from being applied to the output control transistor TR2 when the switch S2 is turned off, and the diode DR5 can prevent the output control transistor TR2 from being damaged by the surge voltage.

THIRD PREFERRED EMBODIMENT

Figure 4:
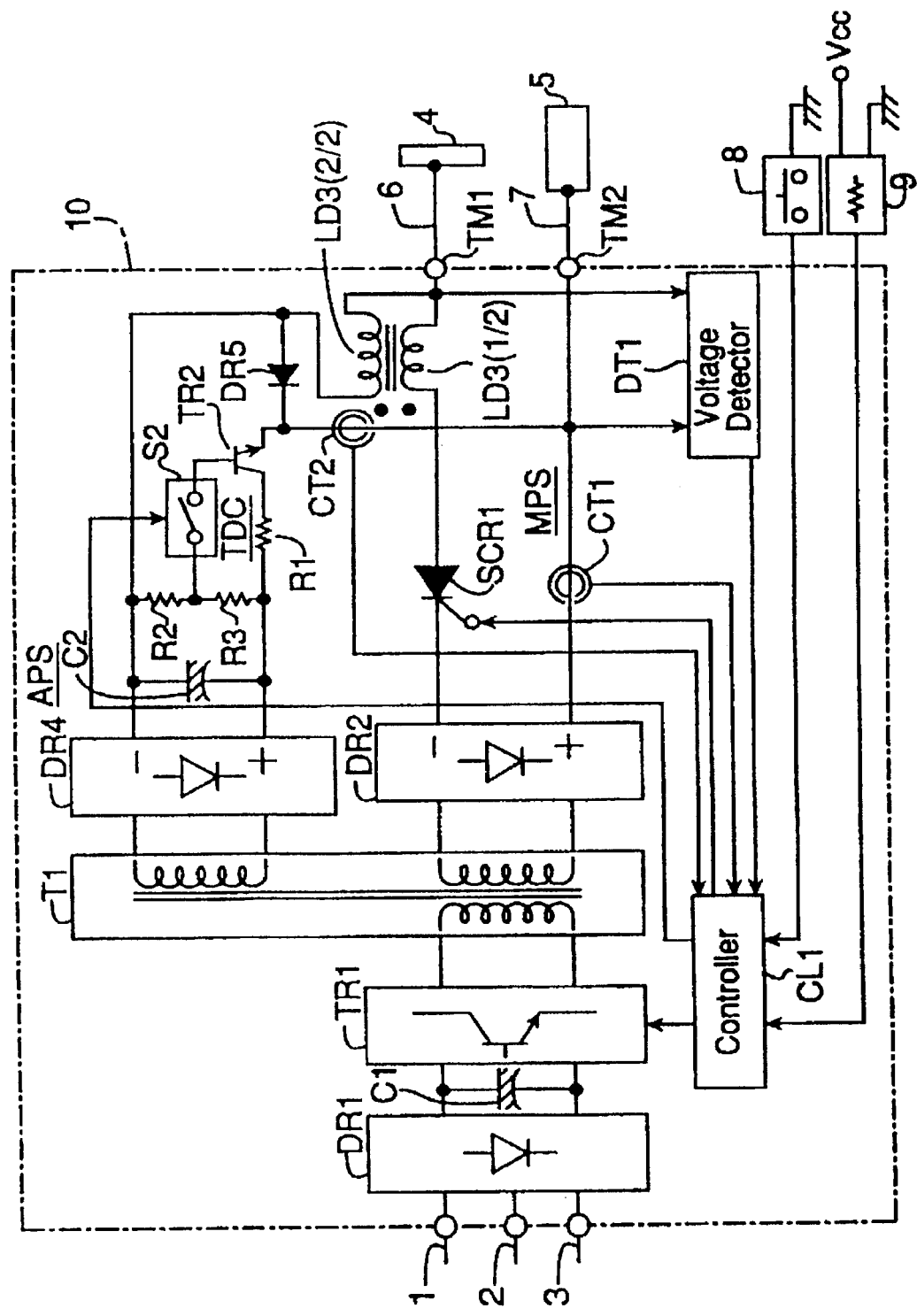
FIG. 4 is a circuit diagram of an arc processing apparatus of a third preferred embodiment of the present invention.

FIG. 4 is a diagram of an arc processing apparatus of a third preferred embodiment of the present invention.

As is apparent from comparison between FIGS. 3 and 4, the arc processing apparatus of the third preferred embodiment is characterized in comprising a first DC reactor LD3 (1/2) and a second DC reactor LD3 (2/2), in stead of the DC reactors LD1 and LD2, wherein windings of the DC reactor LD3 (1/2) and LD3 (2/2) are wound around an identical iron core with their polarities set so that currents flowing through each windings from each power sources MPS and APS magnetize the common iron core in an identical direction, i.e., so that magnetic fluxes in the same direction are generated when currents flow in both the windings in the same direction. The other components or assemblies having the same functions as those of the preferred embodiment shown in FIG. 3 are denoted by the same reference numerals shown in FIG. 3, and no description is provided therefor.

In the apparatus shown in FIG. 4, a short-circuit current of the auxiliary power source APS starts to flow when the electrode 4 is put in contact with the workpiece 5. Subsequently, when the electrode 4 is separated from the workpiece 5, the current abruptly or suddenly reduces to vanish the arc. However the current is prevented from reducing by the electro-magnetic energy that has been accumulated in the second DC reactor LD3 (2/2). Therefore, the relatively small arc is not interrupted, thereby allowing the arc to smoothly change or shifted into a welding arc. In response to the detection signal of the output voltage from the voltage detector DT1, the controller CL1 decides that an arc has been generated. Then, the controller CL1 makes the thyristor SCR1 conductive, and then, turns off the switch S2. In this stage, the electro-magnetic energy which has been accumulated in the second DC reactor LD3 (2/2) is transferred to the first DC reactor LD3 (1/2) that shares the iron core. That is, the current that has flowed through the second DC reactor LD3 (2/2) is transformed in inverse proportion to a turn ratio of the DC reactor LD3 (2/2) to the LD3 (1/2), so that a current flows through the first DC reactor LD3 (1/2). Therefore, the relatively small arc can be switched or shifted into a welding arc without waste, and almost no surge voltage is generated when the switch S2 is closed. Furthermore, in a manner similar to that of the first preferred embodiment shown in FIG. 1, the output voltage of the auxiliary power source circuit can be lowered by the operation of the output control transistor TR2.

FOURTH PREFERRED EMBODIMENT

Figure 5:
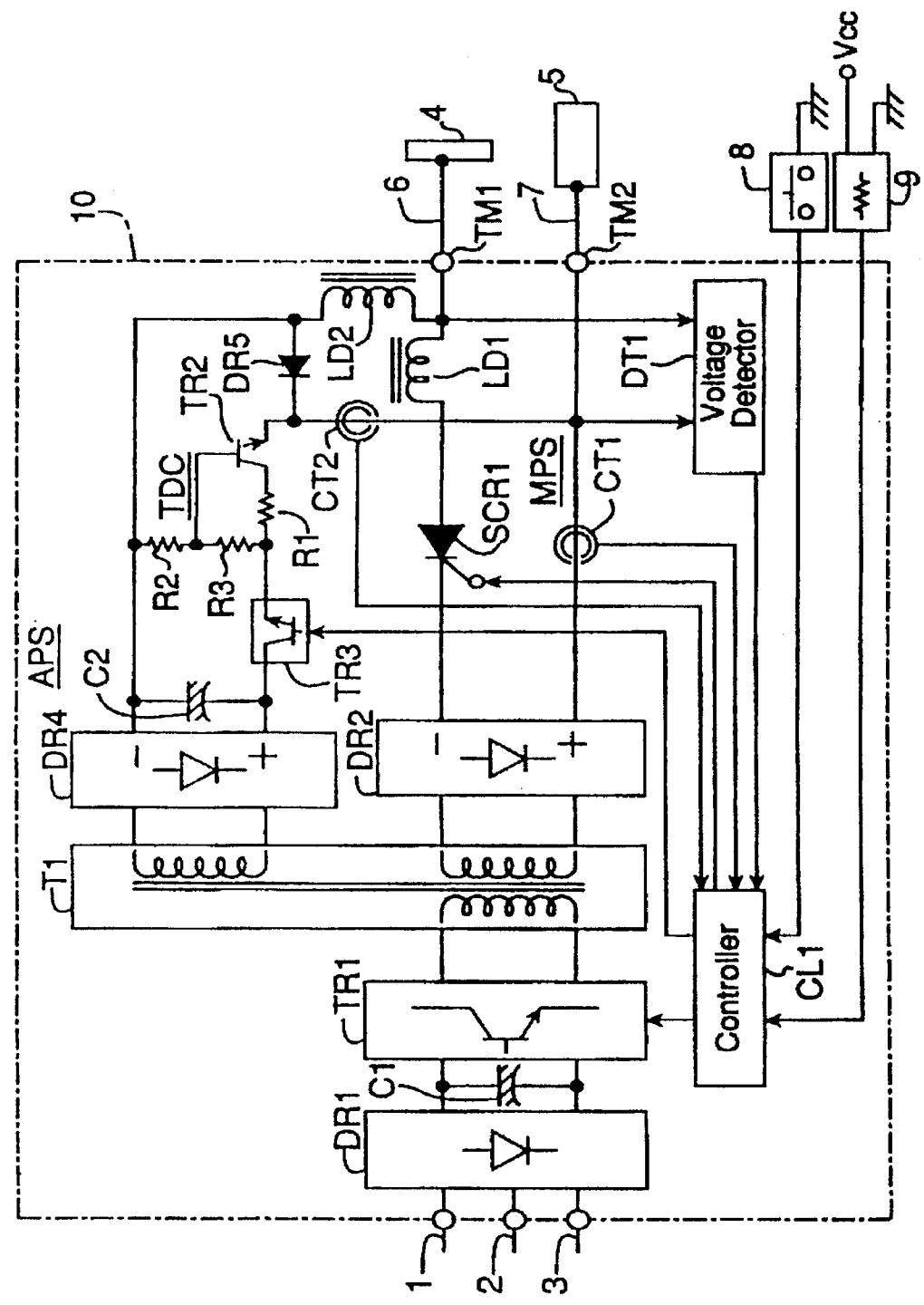
FIG. 5 is a circuit diagram of an arc processing apparatus of a fourth preferred embodiment of the present invention.

FIG. 5 shows an arc processing apparatus of a fourth preferred embodiment of the present invention.

As is apparent from comparison between FIGS. 3 and 5, the arc processing apparatus of the fourth preferred embodiment is characterized in comprising a switching transistor TR3 in stead of the switch S2, wherein the collector of the switching transistor TR3 is electrically connected to the positive electrode of the smoothing electrolytic capacitor C2, the emitter of the switching transistor TR3 is electrically connected through the current-limiting resistor R1 to the collector of the output control transistor TR2, and a switching ON/OFF control signal is inputted from the controller CL1 to the base of the output control transistor TR3. It is noted that the connection point between the resistors R2 and R3 is directly connected to the base of the output control transistor TR2, i.e., both the terminals of the switch S2 shown in FIG. 3 are short-circuited. The other components or assemblies having the same functions as those of the preferred embodiment shown in FIG. 3 are denoted by the same reference numerals shown in FIG. 3, and no description is provided therefor.

In the arc processing apparatus shown in FIG. 5, the switching transistor TR3 has the same function as that of the switch S2 of the second preferred embodiment shown in FIG. 3, and has the same operation as that of the preferred embodiment shown in FIG. 3.

The main power source MPS and the auxiliary power source APS are supplied from the inverter transformer T1 in each of the preferred embodiments shown in FIGS. 1, 3, 4 and 5. However, a commercial frequency power source may be used as the auxiliary power source APS.

In the above-mentioned preferred embodiments, the current limiting resistor R1 is used for giving a drooping characteristic to the output characteristic of the auxiliary power source circuit. However, in stead of the current limiting resistor R1, it may also obtain a constant-current characteristic or a drooping characteristic through a feedback control by detecting the output current of the auxiliary power source circuit by the auxiliary power current detector CT2 and comparing the output current with a predetermined reference value. In the feedback control of the controller CL1, when the output current of the auxiliary power source circuit is in range from zero to the predetermined positive threshold current (corresponding to P2 of FIG. 2), the controller CL1 turns on the switch S2 so that the voltage divided by the two resistors R2 and R3 is applied to the base of the output control transistor TR2, and this results in a constant-current characteristic of the auxiliary power source circuit. Further, when the output current of the auxiliary power source circuit is in range from the above-mentioned predetermined positive threshold current (corresponding to P2 of FIG.2) to a predetermined short-circuit current, the controller CL1 directly applies a turn-on signal to the base of the output control transistor TR2 so as to completely turn on the output control transistor TR2, and this results in a drooping characteristic of the auxiliary power source circuit.

According to the preferred embodiments of the present invention, in the arc processing apparatus of the system in which the electrode 4 thereof is once short-circuited with the workpiece 5 and is then separated from the workpiece 5 in the arc start stage, the output voltage of the auxiliary power source APS is limited or suppressed by the output control transistor TR2 and the output transistor driving circuit TDC for the purpose of increasing the short-circuit current of the auxiliary power source APS without increasing the no-load voltage of the auxiliary power source APS nor making gradual the inclination of the drooping characteristic.

In the other preferred embodiments in which the DC reactor LD2 or LD3 (2/2) is connected in series between the original auxiliary power source APS and the output terminals TM1 and TM2, a relatively small arc is stably generated by generating a surge voltage to compensate for a shortage of the output voltage when the electrode is separated from the workpiece.

Accordingly, a welding arc can be smoothly generated without making the electrode fixedly adhere to the workpiece nor interrupting the relatively small arc when the electrode is separated from the workpiece.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An arc processing apparatus for supplying an electric power for an arc process through output terminals to a load containing an electrode and a workpiece to be processed, comprising:

a main power source for supplying an electric power for arc process through said output terminals to said load;

an auxiliary power source for supplying another electric power through said output terminals to said load, said auxiliary power source having a no-load voltage higher than that of said main power source and an electric power capacity smaller than that of said main power source;

first output switching means for turning on or off supply of the electric power from said main power source;

second output switching means for turning on or off supply of the electric power from said auxiliary power source;

arc detecting means for detecting generation of an arc by detecting whether or not a voltage between said output terminals is lower than a predetermined threshold voltage, and outputting an arc detection signal;

control means for turning on said second output switching means so as to short-circuit said electrode with said workpiece and to perform an arc activation, and thereafter, in response to the arc detection signal, for turning on said first output switching means;

output control transistor electrically connected in series between said auxiliary power source and said output terminals; and driving means for controlling said output control transistor so that an output voltage from said output terminals becomes a predetermined no-load voltage in a range of an output current flowing in said output terminals from zero to a predetermined threshold current.

2. The arc processing apparatus as claimed in claim 1, further comprising:

a DC reactor electrically connected in series between said output control transistor and said output terminals.

3. The arc processing apparatus as claimed in claim 2, further comprising:

a further DC reactor electrically connected in series between said main power source and said output terminals.

4. The arc processing apparatus as claimed in claim 3, further comprising:

a current limiting resistor for providing a drooping characteristic in an output voltage to an output current characteristic of said auxiliary power source, said current limiting resistor being electrically connected in series between said auxiliary power source and said output control transistor.

5. The arc processing apparatus as claimed in claim 3, further comprising:

feedback control means for providing a constant-current characteristic in a range of the output current from zero to the predetermined threshold current, and providing a drooping characteristic in another range of the output current from the predetermined threshold current to a predetermined short-circuit current, in an output voltage to an output current characteristic of said auxiliary power source.

6. The arc processing apparatus as claimed in claim 2, further comprising:

a current limiting resistor for providing a drooping characteristic in an output voltage to an output current characteristic of said auxiliary power source, said current limiting resistor being electrically connected in series between said auxiliary power source and said output control transistor.

7. The arc processing apparatus as claimed in claim 2, further comprising:

feedback control means for providing a constant-current characteristic in a range of the output current from zero to the predetermined threshold current, and providing a drooping characteristic in another range of the output current from the predetermined threshold current to a predetermined short-circuit current, in an output voltage to an output current characteristic of said auxiliary power source.

8. The arc processing apparatus as claimed in claim 1, further comprising:

a first DC reactor electrically connected in series between said main power source and said output terminals; and a second DC reactor electrically connected in series between said output control transistor and said output terminals;

wherein windings of said first DC reactor and windings of said second DC reactor are wound around an iron core so that magnetic fluxes in the same direction are generated when currents flow in both of the windings of said first DC reactor and the windings of said second DC reactor respectively from said main power source and said auxiliary power source in an identical direction.

9. The arc processing apparatus as claimed in claim 8, further comprising:

a current limiting resistor for providing a drooping characteristic in an output voltage to an output current characteristic of said auxiliary power source, said current limiting resistor being electrically connected in series between said auxiliary power source and said output control transistor.

10. The arc processing apparatus as claimed in claim 8, further comprising:

feedback control means for providing a constant-current characteristic in a range of the output current from zero to the predetermined threshold current, and providing a drooping characteristic in another range of the output current from the predetermined threshold current to a predetermined short-circuit current, in an output voltage to an output current characteristic of said auxiliary power source.

11. The arc processing apparatus as claimed in claim 1, further comprising:

a current limiting resistor for providing a drooping characteristic in an output voltage to an output current characteristic of said auxiliary power source, said current limiting resistor being electrically connected in series between said auxiliary power source and said output control transistor.

12. The arc processing apparatus as claimed in claim 1, further comprising:

feedback control means for providing a constant-current characteristic in a range of the output current from zero to the predetermined threshold current, and providing a drooping characteristic in another range of the output current from the predetermined threshold current to a predetermined short-circuit current, in an output voltage to an output current characteristic of said auxilary power source.

* * * * *